United States Patent [19]

Vo

[11] Patent Number: 5,725,187
[45] Date of Patent: Mar. 10, 1998

[54] CAMERA MOUNT DEVICE

[75] Inventor: John Vo, Powell, Ohio

[73] Assignee: Columbus Camera Group, Inc., Columbus, Ohio

[21] Appl. No.: 673,143

[22] Filed: Jul. 1, 1996

[51] Int. Cl.⁶ .......................... F16M 11/00; G03B 17/00
[52] U.S. Cl. ........................ 248/178.1; 248/179.1; 248/183.2; 396/428
[58] Field of Search ................. 248/178.1, 179.1, 248/183.2; 396/428

[56] References Cited

U.S. PATENT DOCUMENTS

| | | | |
|---|---|---|---|
| 3,123,330 | 3/1964 | Robinson | 248/183.2 |
| 3,128,982 | 4/1964 | Christopher | 248/183.2 |
| 3,661,376 | 5/1972 | Hill et al. | 248/183.2 |
| 3,931,947 | 1/1976 | Tagnon | 248/179.1 |
| 4,457,610 | 7/1984 | Kawazoe | 396/428 |
| 5,333,023 | 7/1994 | Oxford. | |

*Primary Examiner*—Victor N. Sakran
*Attorney, Agent, or Firm*—Thomas S. Baker, Jr.

[57] ABSTRACT

A camera mount device for mounting a camera on a tripod has pivot members which enable a camera to be rotated about one or more axes without being lifted and has a stop member which provides quick engagement and disengagement with rotating member to enable the camera to be accurately and rigidly positioned very quickly.

7 Claims, 3 Drawing Sheets

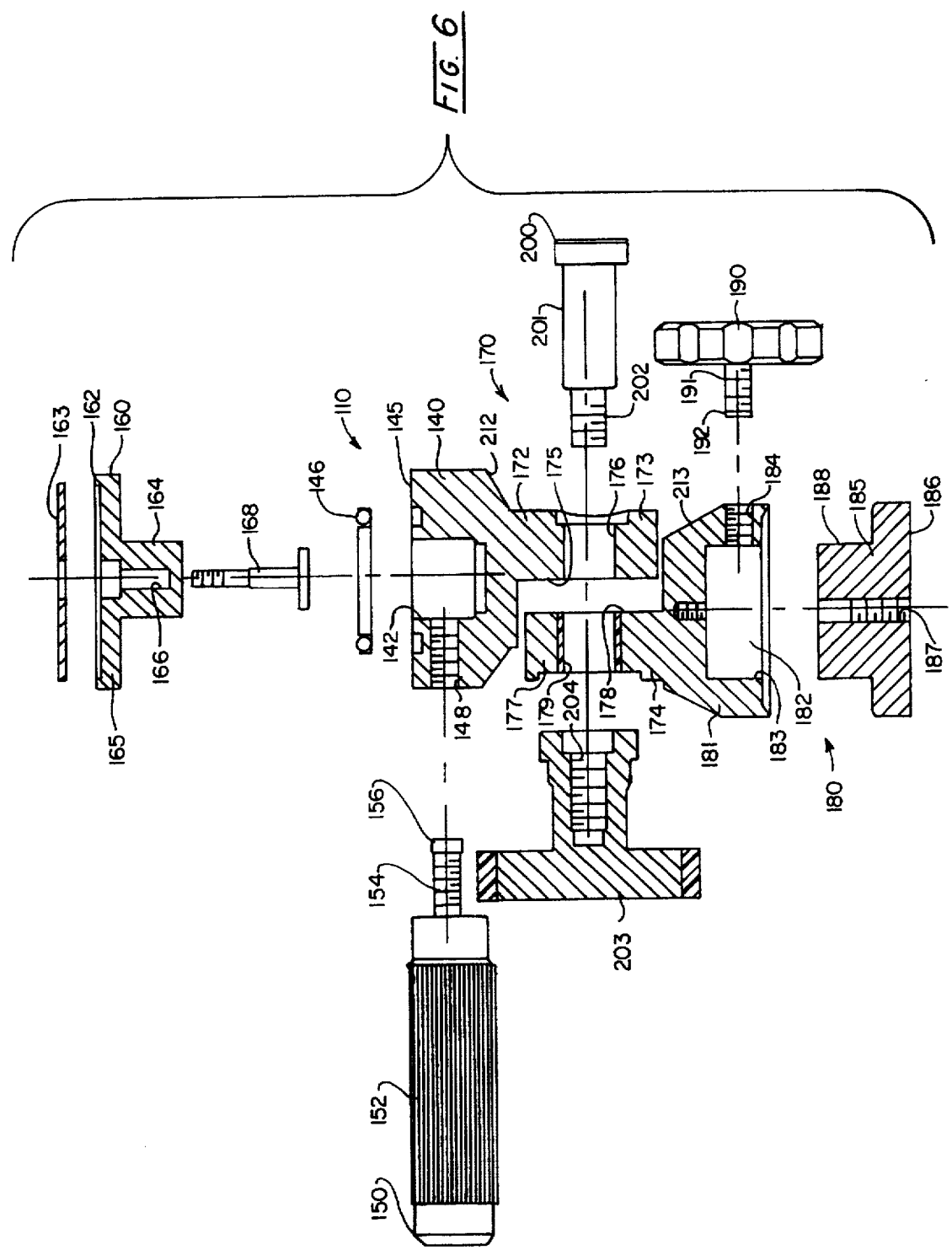

CAMERA MOUNT DEVICE

FIELD OF THE INVENTION

This invention relates to a camera mount device which rotatably connects a camera to a tripod for rotation about one or more axes. The camera mount device enables a camera to be rotated without being lifted and secures the camera in a fixed position by a slight rotation of a stop member. Conversely, the camera is released by a slight rotation of the stop member in the reverse direction.

BACKGROUND OF THE INVENTION

This invention relates to a camera mount device for rotatably connecting a large camera rigidly to a tripod for rotation about one or more axes. The device enables large cameras to be easily moved to different positions and to be easily connected and disconnected from a tripod.

A typical quick release connecting device for a large camera includes a camera stud attachment which is threaded into the bottom of a camera. Upon actuation of a quick release handle to secure the camera in position the stud is drawn downwardly to cause the bottom of the camera to be moved into firm engagement with the top surface of a quick release housing rigidly mounted on a tripod. Rotation of the camera with respect to the quick release housing typically is prevented by a serrated washer interposed between the bottom surface of the camera and the quick release housing. At the onset, a serrated washer, while preventing rotation is undesirable inasmuch as it tends to scratch the bottom of a camera surface. Additionally, the quick release mechanism itself offers no adjustment in terms of the downward force it exerts on the stud rigidly affixed to the camera body. Thus, if too much force is exerted downwardly in the stud, it tends to distort the camera body.

A further disadvantage of prior art mechanisms resides in the fact that each time it is desired to rotate the camera about a vertical axis the camera must be lifted vertically upwardly away from the top surface of the quick release housing and thereafter drawn back down against the surface. Lifting a camera which may weight in excess of forty pounds is awkward and difficult at best. Additionally, precise orientation of the camera about the vertical axis becomes quite difficult.

Lastly, it has been found that prior art mechanism for rotatably securing a camera to a tripod lack the means to secure a large camera to a tripod with the requisite degree of rigidity necessary to obtain satisfactory professional photographic results.

The instant invention provides a quick release camera mount device which enables a camera to be easily rotated about one or more axes with respect to a tripod and to be easily secured in or released from any position.

SUMMARY OF THE INVENTION

To obtain the objectives of this invention, I provide a camera mount device having mating parts which rotate with respect to one another, one of which mounts a camera whereas the other attaches to a tripod. The mating components are adapted to rotate with respect to one another but may be quickly locked in a desired position and securely held upon a slight rotation of a stop member. The secured components may be readily released and moved to another position, all without lifting the camera.

BRIEF DESCRIPTION OF DRAWINGS

FIG. 6 is a fragmented side elevational cross-sectional view of the camera mount device of FIG. 5.

DETAILED DESCRIPTION OF THE INVENTION

Figure 1:
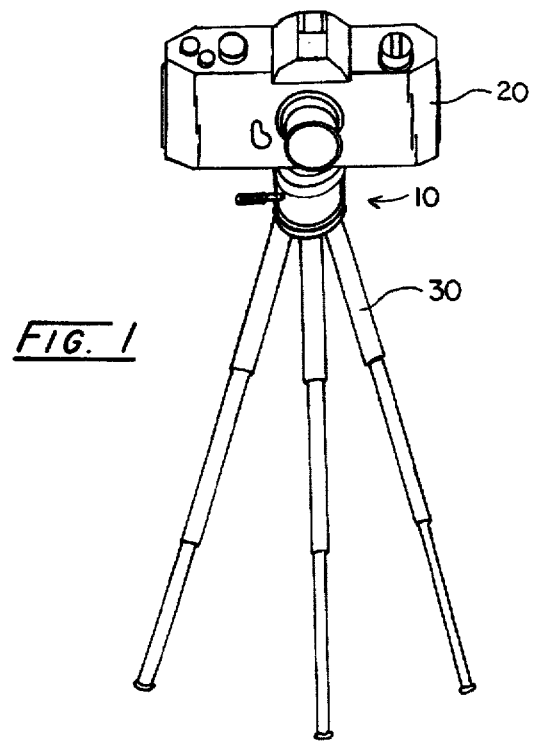
FIG. 1 is a perspective view of a camera rotatably mounted on a tripod through a first embodiment of the camera mount device of the present invention.

FIG. 1 illustrates a camera mount device 10 of the present invention which secures a camera 20 to a tripod 30. In accordance with the present invention, generally large cameras, that is, those weighing at least ten and sometimes more than forty pounds are attached to a tripod 30 utilizing the camera mount device 10 of the instant invention. Although the term "tripod" will be utilized throughout this specification, it is to be understood that the camera supporting structure may contain three or more legs and generally encompasses any type of suitable camera support.

Figure 2:
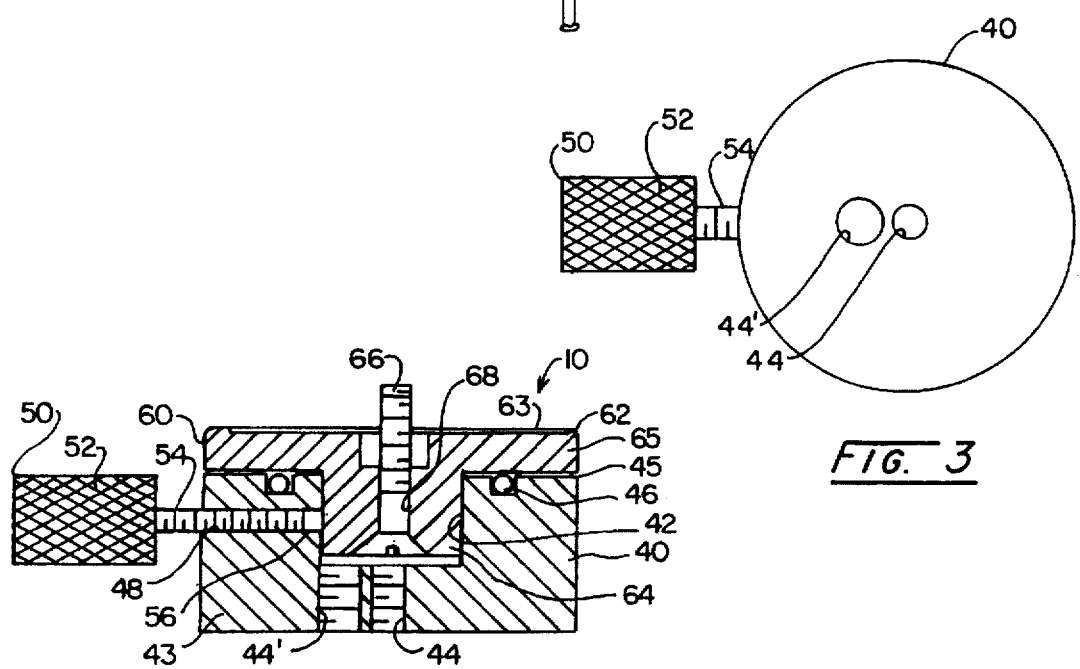
FIG. 2 is a side elevational cross-sectional view of the camera mount device illustrated in FIG. 1.

Referring to FIG. 2, the quick release camera mount device 10 of the instant invention includes a camera mount housing 40, a stop member 50, and a camera support 60. The housing 40 contains a central downwardly extending, cylindrical recess defined by a vertical side wall 42. The bottom 43 of housing 40 has a pair of threaded fastener receiving apertures 44 and 44' which are of different diameter. A suitable fastener such as a screw, not shown, which is captured in the top of a tripod 30 is received in one of the apertures 44, 44' to fasten housing 40 to the tripod 30. When so connected, the camera mount housing 40 is rigidly connected to the tripod 30. Housing 40 preferably has a smooth, flat top surface 45 which mounts a camera support member 60 having a central, downwardly extending cylindrical projection 64 adapted to be received in recess 42 and a laterally extending support area 65. The housing top surface 45 has a bearing 46 which rotatably engages the bottom of the support area 65 of camera support member 60.

Extending laterally through camera mount housing 40 is a threaded aperture 48 which opens into recess 42 to engage the projection 64 of support member 60. A stop member 50 has a knob 52 at one end and a threaded shaft 54 at the other end which is received in aperture 48. The terminal portion of shaft 54 mounts a resilient frictional material 56 such that upon contact with camera support 60 cylindrical portion 64, rotation of support 60 is prevented. The composition of the friction material 56 may vary. It may be a hard plastic or nylon material which exhibits a high coefficient of friction with camera support 60.

The top surface 62 of camera support 60 which is adapted to mount a large camera 20 may be covered with cork or other similar material to protect the camera body and to help prevent the camera from rotating thereon. Camera 20 may be attached rigidly to camera support 60 by a threaded fastener 66, which is captured in a central vertically extending aperture 68 within support 60 and is adapted to be received in a threaded aperture in the bottom of the camera. Thus, it may be seen that a camera 20 rigidly affixed to camera support 60 may rotate freely with respect to camera mount housing 40 which is rigidly affixed to tripod 30 without lifting the camera.

The operation of quick release camera mount device be 10 is as follows. Camera mount housing 40 is fastened to tripod 30 by inserting a fastener in one of the threaded apertures 44, 44' and camera support 60 is secured to a camera by turning threaded fastener 68 into a threaded bore in the base of a camera body, not shown. Thereafter, central cylindrical projection 64 of support 60 is inserted into housing recess 42. With lateral stop member 50 retracted, the camera is free to rotate about a vertical axis 360 degrees to any desirable position. Once a desired position has been reached, stop number 50 need only be rotated a few degrees, for example, 10 degrees or less, once an initial contact between friction member 56 and support cylindrical projection 64 is made in order to secure the camera in the selected position. Such minor rotation of stop member 50 results in a very secure engagement preventing rotation of the camera. When it is desired to rotate the camera to another position, a slight counter rotation of the stop member 50 releases support 60 such that the camera may be rotated freely. The result is a quick release of the camera mounting device. Moreover, the resilient material 56 on lateral stop member 50 provides a quick and secure engagement once the desired position has been reached. The camera housing 40 or the camera support 60 may have calibrations imprinted thereon indicating degrees of rotation.

While in the preferred embodiment of the invention the camera mount housing 40 has a cylindrical recess defined by wall 42 which receives a cylindrical projection 64 from camera support member 60, the device would function in the same manner if the recess was formed in the camera support member and the projection was formed on the camera mount housing.

Figure 3:
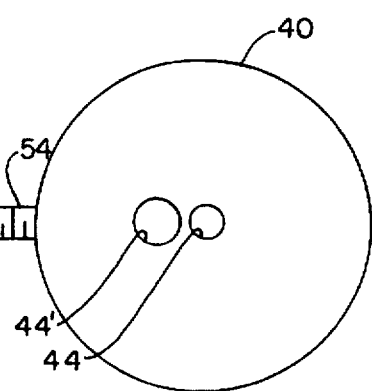
FIG. 3 is a bottom view of the camera mount device of FIG. 2.

While the quick release camera mount device 10 illustrated in FIGS. 1 through 3 allows a camera to be rotated about a single vertical axis in some instances a quick release device which allows a camera to rotate about additional axes may be desired.

Figure 4:
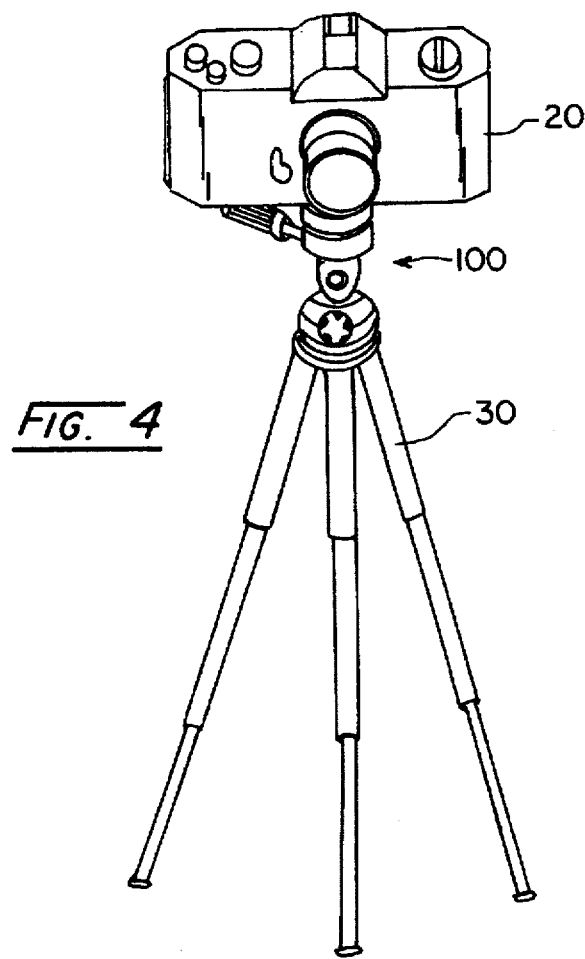
FIG. 4 is a perspective view of a second embodiment of a camera mount device of the instant invention.
Figure 5:
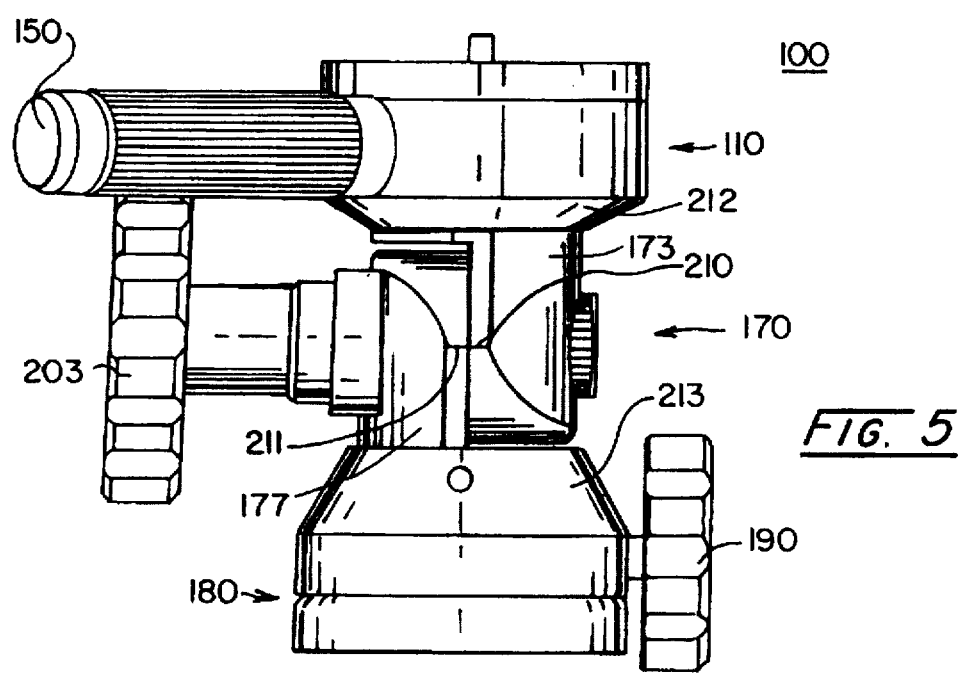
FIG. 5 is a side view of the camera mount device of FIG. 4.

Referring now to the embodiment of FIGS. 4–6, a quick release camera mount device 100 which enables a camera to be rotated about multiple axes is shown having three main components including a camera mount device 110, a tripod mount assembly 180 and a pivot joint assembly 170 interposed therebetween. The camera mount device 110 is very similar to that of the embodiment disclosed in FIGS. 1–3 and corresponding parts of this embodiment are indicated by the same number with a 1 prefix. Turning to the camera mount device 110, the device includes a camera mount housing 140 having a central downwardly extending cylindrical recess defined by a vertical wall 142. The housing 140 has a smooth flat top surface 145 which mounts a camera support member 160 having a central, downwardly extending cylindrical projection 164 adapted to be received in recess 142 and a laterally extending support area 165. The housing top surface 145 has a bearing raceway 146 mounted therein which engages the bottom of support area 165 of camera support member 160. The top surface 162 of camera support 160 is covered with a material such as cork 163 to protect the base of a camera. A threaded aperture 148 extends laterally through housing 148 and intersects recess wall 142. A lateral stop member 150 having a threaded shaft 154 with knob 152 at one end and a resilient frictional member 156 at the other end is received in aperture 148 and engages the cylindrical projection 164 of camera support member 160.

A central vertical aperture lee is formed in camera support 160. This aperture receives a fastener 168 such as a screw to enable a camera to be rigidly attached to camera support 160. Thus, it may be observed that camera support 160 may rotate freely about a vertical axis with respect to camera mount housing 140. Lateral stop member 150 secures camera support 160 in a desired angular position within camera mount housing 140.

While in the instant embodiment of the invention the camera mount housing 140 has a cylindrical recess defined by wall 142 which receives a cylindrical projection 164 from camera support member 160, the device would function in the same manner if the recess was formed in the camera support member and the projection was formed on the camera mount housing.

As mentioned previously, the embodiment of FIGS. 4–6 contains a pivot joint indicated generally at 170 which enables camera support 160 to pivot about a horizontal axis. Pivot joint 170 includes an upper pivot member 172 and lower pivot member 174. Upper pivot member 172 preferably is integral with camera mount housing 140 as shown, but it also may be connected thereto in any conventional manner. Lower pivot member 174 may be integral with a tripod mount assembly 180 as shown, or it may be connected thereto in any conventional manner. Also, lower pivot member 174 of pivot joint 170 may be connected to the tripod without use of a tripod mount assembly 180. Thus, in such an embodiment, there would be two rotational axes; the vertical axis of the camera support 162 and the horizontal axis of pivot joint 170.

Referring again to FIGS. 4–6, it may be seen that upper pivot member 172 has a vertically downwardly extending flange 173 integral with camera mount housing 140 with a flat inner surface 175 and a horizontal bore 176. Similarly, lower pivot member 174 has a vertically upwardly extending flange 177 integral with a tripod housing 181 described hereinbelow with a flat inner surface 178 and a horizontal bore 179. Upper and lower pivot members are jointed with their flanges 173 and 177 oriented such that the flat inner surfaces 175 and 178 are abutting and the horizontal bores 176 and 179 are in axial alignment to form pivot joint 170.

A bolt 200 having a smooth cylindrical outer surface 201 which fits snugly within flange bores 176 and 179 and a threaded end portion 202 mates with an adjustment knob 203 having a threaded inner bore 204 which receives threaded end portion 202 to clamp upper and lower pivot members 172 and 174 together. Knob 203 may be loosened to enable upper pivot member 172 and camera support 160 to rotate about a horizontal axis. In FIG. 4 the pivot members 172 and 174 are aligned such that the axis of camera mount housing 140 is in vertical alignment with the axis of tripod mount housing 181. Such alignment is indicated visually when line 210 inscribed on upper pivot flange 173 is aligned with line 211 inscribed on lower pivot flange 177 as shown in FIG. 5.

Upper pivot member 172 may be rotated 90 degrees in either direction from the central position indicated in FIGS. 4 and 5. In other words the camera depicted in FIG. 4 may be moved to a vertical orientation in either direction (clockwise or counterclockwise) of the horizontal orientation shown. When the camera is rotated the full 90 degrees in either direction a tapered surface 212 on upper pivot member 172 engages a similarly tapered surface 213 on lower pivot member 174.

Tripod mount assembly 180 is similar to quick release camera mount device 110 except that it is inverted. Tripod mount assembly 180 includes the tripod mount housing 181 at the base of flange having a bore 182 defined by a cylindrical sidewall 183. A threaded aperture 184 extends horizontally through housing 181 and intersects bore 182. A-hat shaped tripod support member 185 having a flat bottom surface 186 adapted to be mounted on a mounting surface, not shown, of a tripod 30, a threaded bore 187 adapted to receive a threaded fastener, not shown, to secure the housing 185 to a tripod has an upwardly projecting cylindrical member 188 adapted to be received in housing recess 182 to join tripod mount housing 181 to tripod support member 185. An adjustment knob 190 having a threaded member 191 with a resilient tip 192 which is received in housing aperture 184 secures the housings 181 and 185. Knob 190 may be loosened by rotating through a small angle to permit housing 181 to rotate about a vertical axis with respect to tripod support member 185 as desired.

While in the instant embodiment of the invention the tripod mount housing 181 has a cylindrical bore 182 defined by sidewall 183 which receives a cylindrical projecting member 188 from a tripod support member 185, the device would function in the same manner if the recess was formed in the tripod support member and the projection was formed on the tripod mount housing.

From the above, it may be seen that the multi axes quick release camera mount device 100 enables a camera to be rotated about three axes without being lifted at any time. Also, the camera mount device 100 provides a quick release securement means when a camera is rotated to a desired position and a quick release disengagement means when a camera is to be rotated to a different position.

Since certain changes may be made in the above-described system and apparatus not departing from the scope of the invention herein and above, it is intended that all matter contained in the description or shown in the accompanying drawings shall be interpreted as illustrative and not in a limiting sense.

I claim my invention as follows:

1. A camera mount device for rotatably mounting a camera to a tripod comprising:
   a camera support member for securely fastening said camera to said support member;
   a camera mount housing;
   a downwardly extending flange extending from the bottom of said camera mount housing having a first planer face and a first bore and forming an upper pivot member;
   wherein one of said camera mount housing and said camera support member has a recess and the other of said camera mount housing and said camera support member has a complementary projection adapted to be received in said recess to rotatably connect said camera mount housing and said camera support member;
   a stop member having a shaft with a friction element at the terminal end thereof rotatably mounted in one of said camera mount housing and said camera support member and movably between a first position in which said friction element engages the other of said camera mount housing and said camera support member and a second position in which said friction element is disengaged from the other of said camera mount housing and said camera support member;
   a tripod mount housing;
   an upwardly extending flange extending from the top of said tripod mount housing having a second planer face and a second bore and forming a lower pivot member;
   a pivot mounted in said first and second flange bores to provide a pivot axis for upper and lower pivot members;
   attachment means for attaching said tripod mount housing to said tripod.

2. The camera mount device of claim 1 wherein said stop member friction element is formed from a resilient non-metallic material.

3. The camera mount device of claim 2 wherein said stop member is movable between said second position and said first position by an angular rotation of less than 10 degrees.

4. The camera mount device of claim 1 wherein said attachment means has a tripod support member;
   wherein one of said tripod mount housing and said tripod support member has a recess and the other of said tripod mount housing and said tripod support member has a complementary projection adapted to be received in said recess to rotatably connect said tripod mount housing and said tripod support member;
   a second stop member having a shaft with a friction element at the terminal end thereof rotatably mounted in one of said tripod mount housing and said tripod support member and movable between a first position in which said friction element engages the other of said tripod mount housing and said tripod support member and a second position in which said friction element is disengaged from the other of said tripod mount housing and said tripod support member.

5. The camera mount device of claim 4 wherein said second stop member friction element is formed from a resilient non-metallic material.

6. The camera mount device of claim 5 wherein said second stop member is movable between said second position and said first position by an angular rotation of less than 10 degrees.

7. A camera mount device for rotatably mounting a camera to a tripod comprising:
   a camera support member for securely fastening said camera to said support member;
   a camera mount housing;
   a downwardly extending flange extending from the bottom of said upper camera mount housing having a first planer face and a first bore and forming an upper pivot member;
   wherein one of said camera mount housing and said camera support member has a recess and the other of said camera mount housing and said camera support member has a complementary projection adapted to be received in said recess to rotatably connect said camera mount housing and said camera support member;
   a stop member having a shaft with a friction element at the terminal end thereof rotatably mounted in one of said camera mount housing and said camera support member and movably between a first position in which aid friction element engages the other of said camera mount housing and said camera support member and a second position in which said friction element is disengaged from the other of said camera mount housing and said camera support member;

a tripod mount housing;

a tripod support member for securely fastening said camera mount device to a tripod;

an upwardly extending flange extending from the top of said tripod mount housing having a second planer face and a second bore and forming a lower pivot member;

a fastener mounted in said first and second flange bores to provide a pivot axis for upper and lower pivot members;

wherein one of said tripod mount housing and said tripod support member has a recess and the other of said tripod mount housing and said tripod support member has a complementary projection adapted to be received in said recess to rotatably connect said tripod mount housing and said tripod support member;

a stop member having a shaft with a friction element at the terminal end thereof rotatably mounted in one of said tripod mount housing and said tripod support member and movable between a first position in which said friction element engages the other of said tripod mount housing and said tripod support member and a second position in which said friction element is disengaged from the other of said tripod mount housing and said tripod support member.

* * * * *